(12) United States Patent
Hall

(10) Patent No.: US 10,506,194 B2
(45) Date of Patent: Dec. 10, 2019

(54) ENHANCED DISPLAY PANELS OF TELEVISION RECEIVING DEVICES AND METHODS

(75) Inventor: Neale Hall, Keighley (GB)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 1624 days.

(21) Appl. No.: 12/363,391

(22) Filed: Jan. 30, 2009

(65) Prior Publication Data

US 2010/0199307 A1 Aug. 5, 2010

(51) Int. Cl.
| | |
|---|---|
| *H04N 5/445* | (2011.01) |
| *H04N 21/25* | (2011.01) |
| *H04N 21/442* | (2011.01) |
| *H04N 21/658* | (2011.01) |
| *H04N 21/478* | (2011.01) |

(52) U.S. Cl.
CPC ....... *H04N 5/44543* (2013.01); *H04N 21/252* (2013.01); *H04N 21/44204* (2013.01); *H04N 21/44218* (2013.01); *H04N 21/44222* (2013.01); *H04N 21/6582* (2013.01); *H04N 21/478* (2013.01)

(58) Field of Classification Search
CPC .. H04N 5/44543; H04N 21/482; H04N 21/84; H04N 21/4821; H04N 21/4345; H04N 2005/44547; H04N 2005/44556; H04N 2005/44565
USPC .......................................... 725/32; 348/552
See application file for complete search history.

(56) References Cited

U.S. PATENT DOCUMENTS

| | | | |
|---|---|---|---|
| 5,465,113 A * | 11/1995 | Gilboy .................... | H04N 7/10 348/E7.049 |
| 5,977,962 A | 11/1999 | Chapman et al. | |
| 6,308,329 B1 * | 10/2001 | Takahashi ................... | 725/153 |
| 6,665,869 B1 | 12/2003 | Ellis et al. | |
| 6,683,630 B1 | 1/2004 | Shoff et al. | |
| 7,386,871 B1 * | 6/2008 | Knudson et al. ............... | 725/92 |
| 8,544,044 B2 * | 9/2013 | Friedlander et al. ........... | 725/51 |
| 2004/0103434 A1 * | 5/2004 | Ellis ................................ | 725/58 |
| 2005/0015799 A1 * | 1/2005 | Park .................... | H04N 5/44543 725/32 |
| 2005/0198545 A1 * | 9/2005 | Wieck et al. ................. | 713/323 |
| 2005/0229226 A1 * | 10/2005 | Relan ..................... | H04H 60/33 725/114 |

(Continued)

*Primary Examiner* — Robert J Hance
*Assistant Examiner* — Anthony Bantomai
(74) *Attorney, Agent, or Firm* — Seed IP Law Group LLP

(57) ABSTRACT

Information may be provided via a display panel of a television receiving device by determining satisfaction of at least one condition while at least one television program is selected, and displaying information other than the information regarding the selected at least one television program via the display panel of the television receiving device when satisfaction of the at least one condition is determined. Determining satisfaction of the condition may involve: determining an elapse of a predetermined period of time without user input after the information regarding the selected at least one television program is initially displayed; determining an elapse of a predetermined period of time without a change of the selected at least one television program after the information regarding the selected at least one television program is initially displayed; determining a standby state of the television receiving device; or determining an off state of the television receiving device.

40 Claims, 3 Drawing Sheets

(56) References Cited

U.S. PATENT DOCUMENTS

| | | |
|---|---|---|
| 2005/0235319 A1 | 10/2005 | Carpenter et al. |
| 2005/0283800 A1 | 12/2005 | Ellis et al. |
| 2007/0157242 A1 | 7/2007 | Cordray et al. |
| 2008/0060019 A1* | 3/2008 | Shikata .............. H04N 5/44582 725/56 |
| 2009/0165063 A1* | 6/2009 | Chow et al. .................... 725/87 |

* cited by examiner

ENHANCED DISPLAY PANELS OF TELEVISION RECEIVING DEVICES AND METHODS

TECHNICAL FIELD

The inventive field relates generally to a display panel of a client device, such as a set top box (STB), digital video recorder (DVR) or similar device. The inventive field also relates to providing an enhanced display panel for such devices.

BACKGROUND DISCUSSION

The proliferation of subscription television programming, the increasing number of available channels, and the corresponding increase in television programming have led to continued development of onscreen program directories and guides. Additional user interaction with television programming, including various forms of menus, interfaces and the like, have also been implemented via onscreen displays.

In addition to onscreen displays, some television receiving devices include a display panel of some form, such as liquid crystal display (LCD), light emitting diode (LED), and the like. Conventionally, the display panel is used to display information regarding the television program and or channel currently being received and transmitted to an associated television or other display device for viewing. For example, the display panel may display the channel and/or title of the current program.

SUMMARY

As noted above, the display panel of conventional television receiving devices is typically employed for the display of information regarding the currently tuned television program via alpha-numeric text. As the tuned program changes, either by occurrence of the next program on the current channel or by a change in the channel, the information displayed by the display panel may change accordingly. Although the display panel of conventional television receiving devices may thus be useful to provide information regarding currently tuned programs, the display panel is limited to such information. Various embodiments described herein provide an enhanced display panel that is configured to display additional information other than currently tuned program information. Various embodiments described herein provide such an enhanced display panel that is compatible with conventional use, allowing a user to obtain the additional information as well as the conventionally displayed information via the display panel.

Various embodiments relate to television receiving devices and methods for enhancing a display panel for such devices. Enhancements may relate to displaying almost any information other than information regarding the currently tuned program. For example, the additional information may be in the form of promotions of programming, suggestions of programming, or advertising fro related or unrelated products or services. The additional information may include next program information, such as, the title of and the time until the next program on the current channel. Additionally or alternatively, the additional information may include next program information for the next program the device is scheduled to tune. Additionally or alternatively, the additional information may include a reminder regarding an upcoming program that is scheduled to air and/or be recorded. Additionally or alternatively, a message from a television service provider and/or another television receiving device or a notification of such a message may be displayed via the panel display.

Some embodiments may comprise a method of providing information via a display panel of a television receiving device. The method may include: receiving a television signal including at least one television program at the television receiving device; selecting the at least one television program for output by the television receiving device; displaying information regarding the selected at least one television program via the display panel of the television receiving device; determining satisfaction of at least one condition while the at least one program is selected; and displaying information other than the information regarding the selected at least one television program via the display panel of the television receiving device when satisfaction of the at least one condition is determined.

In some embodiments, determining satisfaction of at least one condition may involve determining an elapse of a predetermined period of time without user input after the information regarding the selected at least one television program is initially displayed. In some embodiments, determining satisfaction of at least one condition may involve determining an elapse of a predetermined period of time without a change of the selected at least one television program after the information regarding the selected at least one television program is initially displayed.

In some embodiments, determining satisfaction of at least one condition may involve determining a standby state of the television receiving device. In some embodiments, determining satisfaction of at least one condition may involve determining an off state of the television receiving device.

In some embodiments, displaying information other than the information regarding the selected at least one television program may involve displaying information regarding a television program to be aired in the future. In some embodiments, displaying information regarding a television program to be aired in the future may involve displaying information regarding a next television program to be aired on a same channel as the selected at least one television program. In some embodiments, the information displayed regarding a next television program may include a time until airing.

In some embodiments, displaying information regarding a television program to be aired in the future may involve displaying information regarding a television program that the television receiver device is set to display. In some embodiments, displaying information regarding a television program to be aired in the future may involve displaying information regarding a television program that the television receiver device is set to record. In some embodiments, displaying information regarding a television program to be aired in the future may involve displaying information regarding a television program available for purchase.

In some embodiments, displaying information other than the information regarding the selected at least one television program may involve displaying information regarding a message received by the television receiving device. In some embodiments, the displayed notification may be regarding a message received from a television service provider. In some embodiments, the displayed notification may be regarding a message received from another television receiving device.

In some embodiments, displaying information other than the information regarding the selected at least one television program may involve displaying a message received by the television receiving device. In some embodiments, the displayed message may be received from a television service provider. In some embodiments, the displayed message may be received from another television receiving device.

Other embodiments may comprise a television receiving device for receiving a television signal including a plurality of channels of television programs. The device may include: a tuner configured to select one of the plurality of channels included in the television signal; an output configured to provide the television programs of the selected one of the plurality of channels to a television display device; a display panel configured to display textual information; and a processor configured to cause the display panel to display information regarding a current television program of the television programs of the selected one of the plurality of channels and to display information other than the information regarding the current television program when at least one condition is satisfied.

In some embodiments, the processor may be configured to determine satisfaction of the at least one condition by determining an elapse of a predetermined period of time without user input after the information regarding the selected at least one television program is initially displayed. In some embodiments, the device may include a counter in communication with the processor, the counter configured to set the predetermined period of time.

Some embodiments may provide an enhanced display panel of a television receiving device in the form of a computer-readable storage medium. The medium may include instructions stored thereon that, when executed by a processor, cause the processor to perform the various methods described herein.

By using various embodiments, an enhanced display panel of a television receiving device may be more informative and/or more useful to a user and may also provide additional functionality and/or user interactivity, as compared to known display panels.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

Figure 1:
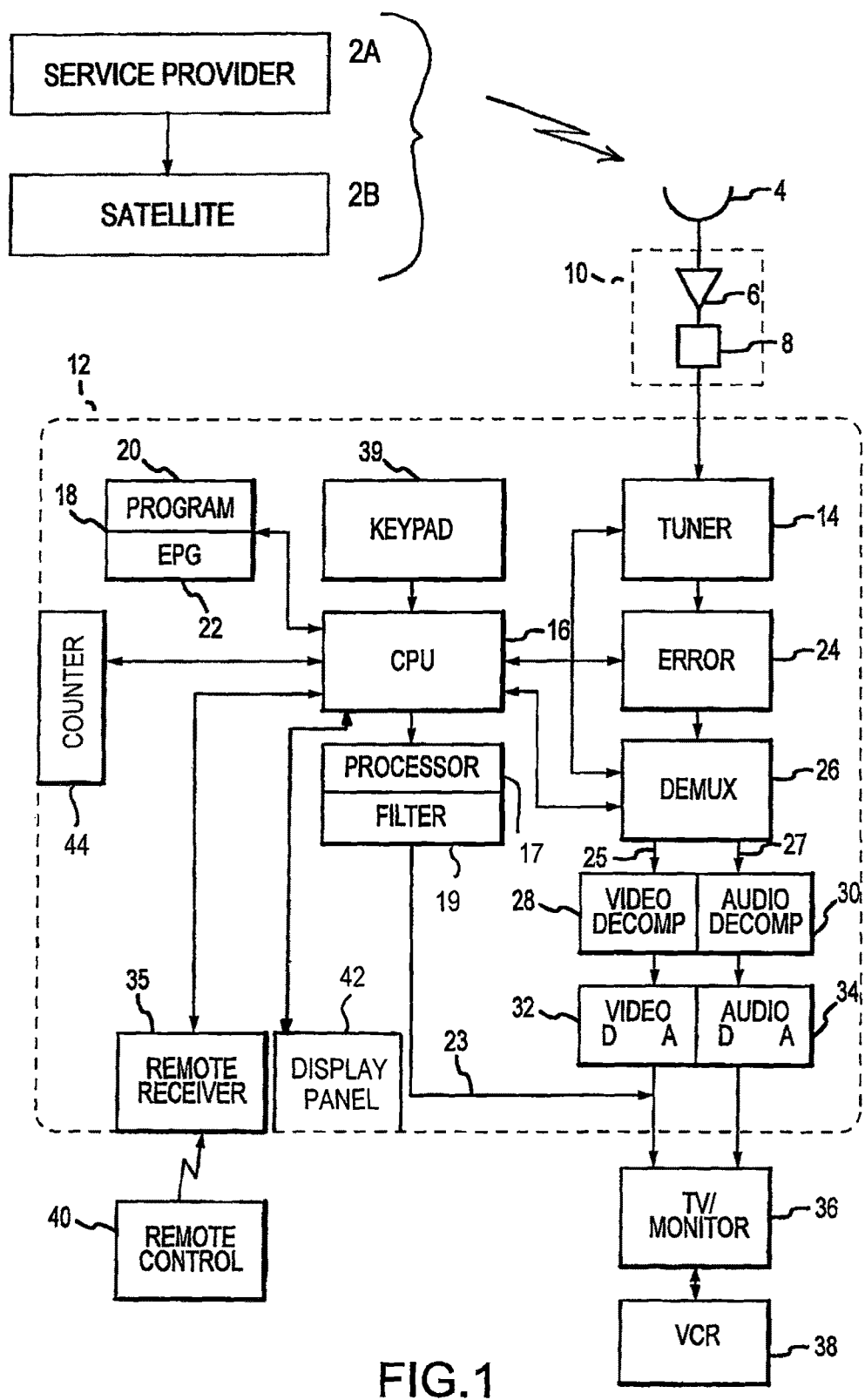
FIG. 1 is a block diagram illustrating major components of an example of a direct broadcast satellite television system.

The embodiments shown in the Figures illustrate systems and methods that may provide an enhanced display panel for a television receiving device. As will be understood from this disclosure, the enhancements relate to providing information other than regarding a currently tuned program. Thus, it should be understood that the enhancements may allow conventional functionality of such a display panel, such as providing the current channel and/or title of the current program, while providing such additional information via the display panel as not contemplated in conventional devices.

In particular, the systems and methods described herein may provide for the display of such additional information upon satisfaction of one or more conditions. For example, the display panel may be controlled to display current channel and/or program information when the television receiving device is initially turned on, and may also display current channel and/or program information as the channel and/or program changes. Changes in channel and/or program may occur automatically, either in accordance with a broadcast schedule or in accordance with device settings for automatic tuning and/or recording of particular programs. Changes in channel and/or program may also occur in response to user input, such as selection of channels, time shifting, or the like.

It may be desirable to display channel and/or program information initially. However, the importance of such information to the user diminishes as time elapses, for example, once the user knows the current channel and/or program. At such point, information other than information regarding the current channel and/or program may be more useful or interesting to the user. As such, one condition may be that a predetermined period of time elapse after the initial display of the current channel and/or program information. Another condition may be that no change in the channel and/or program occur before the predetermined time elapses. In some cases, a condition may be that no user input is received before the predetermined time elapses.

In general, the concept may be to use time, when current channel and/or program information is not typically needed, to display other information via the display panel. It should be understood that, as appropriate or desired, user input and or changes to channel and/or program may override the display of the other information. One advantage of employing the display panel in this manner is that the television display, that is, the display of the television program, need not be interrupted or otherwise detracted from by the display of this other information, as is the case with most conventional communication to the user via display.

Another condition that may be satisfied for the display of such additional information via the display panel may be a mode or state of operation of the television receiving device. In certain operational modes or states of the television receiving device, the display panel may not otherwise be in use. For example, when the device is in a stand-by mode, the display panel may be entirely available for displaying information other than information regarding a currently tuned channel and/or program. As should be readily understood, a stand-by mode of a television receiving device may be a lower-power mode with less operations and/or active functionality as compared to an on mode of the device. As the device is not operational for active television viewing in the stand-by mode, no current channel and/or program information need be displayed by the display panel. Accordingly, other information may be displayed via the display panel when the television receiver device is in stand-by mode. As some devices employ distinct stand-by and/or off modes, it should be understood that the other information may also be displayed via the display panel when the television receiver is in of mode. In either case, a determination that the device is in that particular mode or state may satisfy the condition.

Although the display panel described herein is not limited to a particular technology, it should be understood that the information for display described herein is considered to be textual, that is, alpha-numeric. Although other types of display are not excluded, the information contemplated by this disclosure includes at least some alpha-numeric representation, if not primarily alpha-numeric. In some embodiments, the information may be entirely alpha-numeric.

Further, it should be understood that almost any type of information other than current channel and/or program information may be the additional information displayed via the display panel. While certain examples are provided, it should be understood that such examples are not exhaustive and should not be considered limiting.

Various implementations are possible. For example, satellite, cable, analog or digital terrestrial, internet or other broadcasting technologies may be suitable. Thus, while the following description provides an example in the context of a television service provider employing a satellite broadcast system, it should be understood that such description is not limiting.

Figure 2:
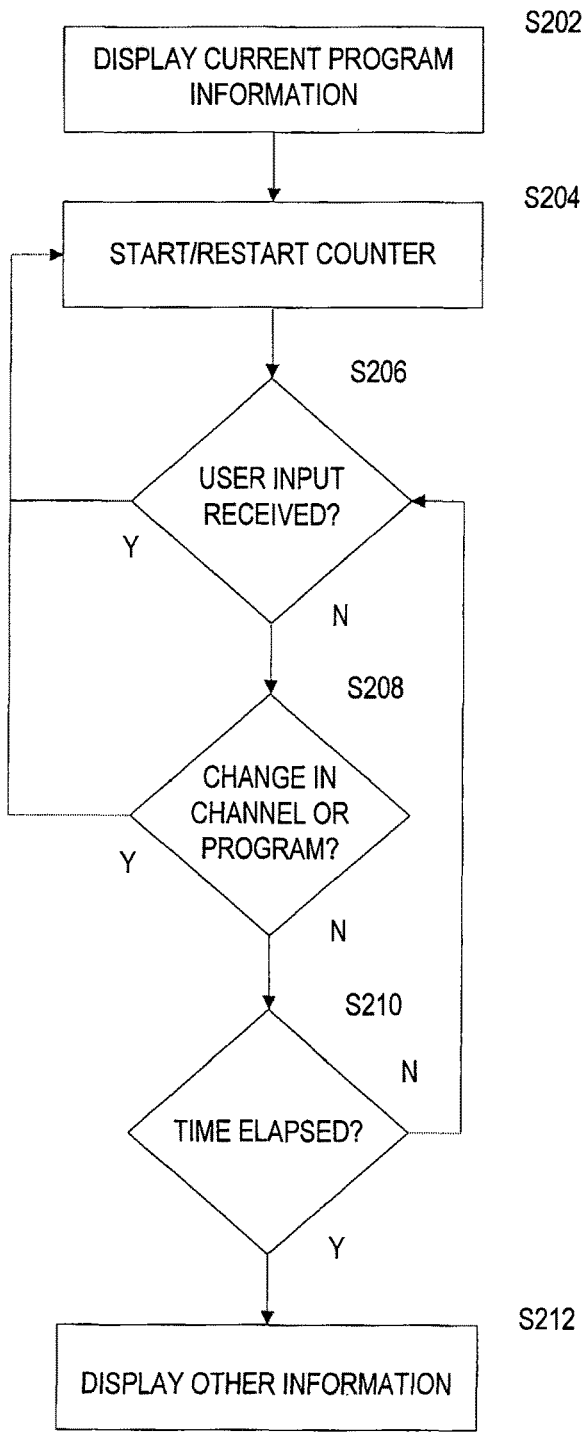
FIG. 2 is a flowchart illustrating a method of providing an enhanced panel display.
Figure 3:
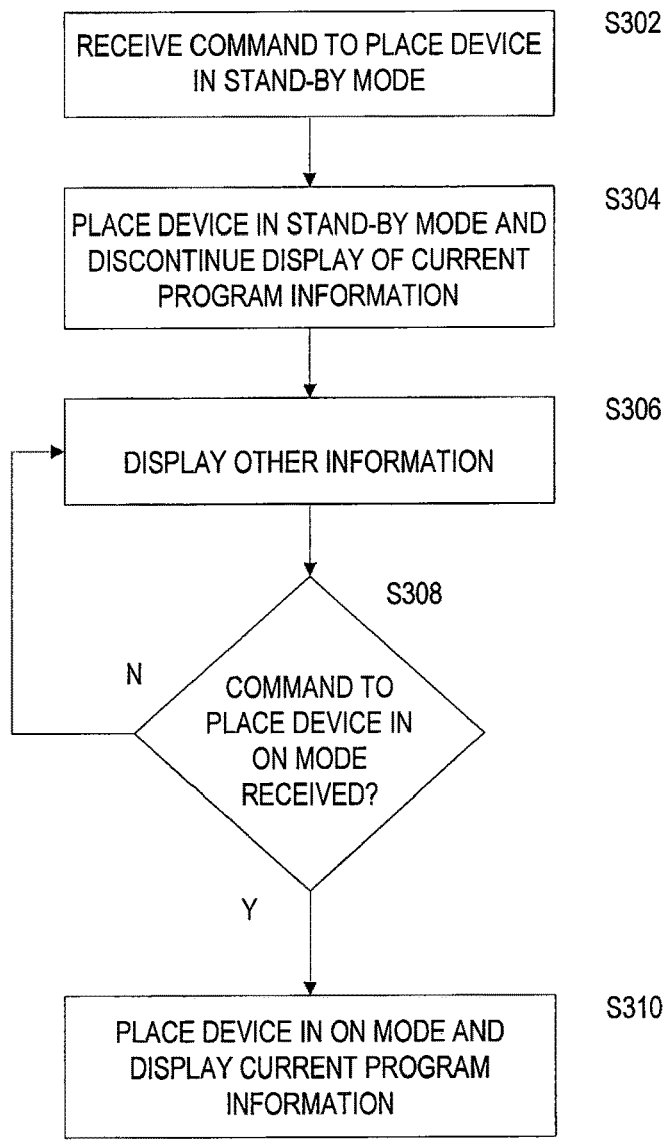
FIG. 3 is a flowchart illustrating another method of providing an enhanced panel display.

The block diagram shown in FIG. 1, and the flowcharts shown in FIGS. 2 and 3 are for illustration only and are not intended to represent the only possible system configurations and process flows. In particular, it should be understood that process steps may be added, omitted and reordered as may be suitable to a particular application. Also, individual components may be added, omitted, replaced and interrelated as may be suitable to a particular application. All details appurtenant to implementing the exemplary processes and systems that are well understood in the art are omitted for simplicity and clarity.

FIG. 1 is a block diagram that shows various components that may be used to implement various features described herein. For example, a direct broadcast satellite system incorporating packetized transmission according to a suitable standard, such as MPEG-2, MPEG-4, or the like, may be used, although any programming source that includes television programming and program information, or otherwise transmits data associated with the television programming, is contemplated. Encrypted direct broadcast satellite (DBS) signals may be transmitted from a source 2, such as a television service provider 2A via a satellite 2B. Such signals may be received as downlinked signals by a satellite antenna 4, such as a parabolic dish of approximately eighteen to thirty-six inches in diameter in one embodiment. Front end processing of the satellite signals may be accomplished by a low noise block converter feed (LNBF) provided in the antenna focal point. This may include a converter module 10 with a low noise amplifier 6, which receives the signals from the feed, and by a down converter 8, which converts the entire frequency band of the satellite signals to a lower frequency range that may be efficiently transmitted, for example, via coaxial cable to a client device, such as a satellite receiver 12. A tuner 14 may select a specific channel from the downlinked signal 2 and feed the selected channel to an error correction and packet synchronization module 24. The error correction and packet synchronization module 24 may output a fully compliant transport stream, which may be directed to a packet demultiplexer 26. Various encoding or formats may be used.

The packet demultiplexer 26 may be an integrated circuit that accepts the packetized, time domain multiplexed data stream of the transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 25 and the video stream 27 may be fully compliant audio and video program elementary streams, respectively. In addition to routing packets of data, the packet demultiplexer 26 may also descramble encrypted data, provide various buffering of the formatted data, and handle a program clock reference to keep a local clock synchronized with the clock at the uplink center (e.g., service provider 2A). Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

An electronic program guide (EPG) 22, as known in the art, may comprise a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 25 to be displayed on the television/monitor 36. It should be understood that the information regarding current channel and/or program may be accessed from the EPG 22.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may comprise an instruction set that creates the EPG 22 and allows a user to manipulate the EPG 22, as discussed further below. While the EPG program 20 may be implemented as hardware, the EPG program 20 may alternatively or additionally comprise a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

As known in the art, programming information contained in the EPG 22 may be displayed on the TV/monitor 36, and information regarding a currently tuned channel and/or program may be displayed on a display panel 42 of the device 12. Additionally, information other than the information regarding the currently tuned channel and/or program may be displayed on the display panel 42 as described herein.

For example, the device 12 may include a counter 44 in communication with the central processing unit 16. When the CPU 16 controls the tuner 14 to select a channel for output to the TV/monitor 36, the CPU 16 may initiate display of information regarding the selected channel and/or the television program currently being aired on the selected channel on the display panel 42. The CPU 16 may also initiate the counter 44 to clock a predetermined period of time. It should be understood that the predetermined period of time may be preset for the counter 44, or may be set by the CPU 16, as appropriate or desired. It should also be understood that the counter 44 may count down or up, as appropriate or desired.

Regardless, if the counter 44 reaches zero or its predetermined value, then the CPU 16 may determine that the predetermined period of time has elapsed, and, in response, may discontinue display of the information regarding the currently tuned channel and/or program via the display panel 42, and may send other information to the display panel 42 for display. However, if the CPU 16 detects a change in the channel and/or program before the counter 44 reaches zero or the predetermined value, the CPU 16 may initiate display of information regarding the new channel and/or program, and may reset the counter 44 accordingly. The change in channel and/or program may result from a change in television programming, or in response to a programmed instruction for the device 12 to tune and/or record a particular program. The change may also result from a user input. Similarly, the CPU 16 may display the current channel and/or program information in response to a user input that request such display, and may reset the counter 44 upon receiving such user input and/or upon causing the display panel 42 to display the current channel and/or program information.

As discussed above, the CPU 16 may also be configured to detect a change in the operational state or mode of the device 12, such as from "on" to "off" or "stand-by." This may be implemented in any suitable manner. For example, the CPU 16 may determine the operational state of the device 12, either directly or via any suitable sensor or detector. The CPU 16 may determine the operational state directly by receiving and/or executing a command to place the device 12 in a particular operational state. Regardless, the CPU 16 may determine, based on the operational state of the device 12 as a condition, that the display panel 42 is available for displaying information other than current channel and/or program information, such as when the device 12 is in an "off" state or a "stand-by" state, in which no currently tuned channel and/or program information is needed by the user.

It should be understood from the foregoing that the particular process or methodology of implementing an enhanced display panel is not critical and that any suitable approach as may be envisioned based on this disclosure may be employed. As such, the actual implementation of the enhanced display panel of a television receiving device as described herein may vary as appropriate or desired for a given application.

Various processes and methodologies may be envisioned based on the foregoing description. A particular example of one method is illustrated in FIG. 2. It should be understood that the method illustrated in FIG. 2 is a relatively simplistic, high level description, and that various modifications may be envisioned for particular applications, as appropriate or desired.

The method may begin at S202, where the display panel may display information regarding the current program. As discussed above, once the display of the current program information is initiated, the method may proceed to S204, where a counter may be started. While a single counter is illustrated in FIG. 1 and described with respect to this method of FIG. 2, it should be understood that any suitable number of preset counters and/or programmable counters may be employed. Thus, it should be understood that different elapsed time periods may be employed for different circumstances to implement a desired operation. For example, different periods of time may be desirable for display of current program information when the device is initially turned on, when an automatic change in channel and/or program occurs, and when user input is received to change channel and/or program.

The method may then proceed to S206 and S208, where determinations may be made as to whether user input, such as requesting display of the current program information, or any change in channel and/or program occurs. This may be implemented by a loop, as suggested by FIG. 2, with a determination of whether the predetermined period of time has elapsed at S210, as gauged by the counter, or may be performed by monitoring for user input and/or channel/program changes prior to receiving a signal from the counter indicating elapse of the predetermined time period. If either user input or channel/program change occurs, then the method may return to S204 to reset the counter.

On the other hand, if neither occurs and the counter expires, the method may continue to S212, where information other than the current program information may be displayed via the display panel. Although not shown for the sake of simplicity, it should be understood that the method may continue, for example, by returning to S202 when a change in channel and/or program occurs and/or a suitable user input, such as a request to view the current program information, is received.

Another example of a method is illustrated in FIG. 3. It should also be understood that the method illustrated in FIG. 3 is a relatively simplistic, high level description, and that various modifications may be envisioned for particular applications, as appropriate or desired.

The method may begin at S302, where the a command to place the device in a stand-by mode or state is received. Then, as S304, the device may be placed in the stand-by mode, and display of information regarding the current program via the display panel may be discontinued. It should be understood that this assumes that the current program information was being displayed when the command was received. More generally, discontinuing display of the information being displayed by the display panel at that time may occur.

As discussed above, once the device is in the stand-by mode, the display panel of the device may be used to display any other information as desired at S306. It should be understood that any suitable approach for displaying other information at S306 may be employed. For example, information received from a service provider (e.g., head end) or another television receiving device, including but not limited to messages or notifications of messages, may be displayed as received, periodically, on a priority basis, or any other desired approach. Further, recommendations or suggestions of programs and/or channels, promotions, events, and the like, as well as various types of advertising may be displayed as appropriate or desired. Further, reminders as set in the device may be displayed to the user. Thus, the timing and other implementation details of S306 will be dependent on a particular application. For example, when the device is in the stand-by mode, the timing of display via the display panel may be determined at the head end, such as by providing control instructions with the information to be displayed.

The method may continue to S308, where a determination may be made as to whether a command to place the device in an "on" mode or state is received. This may be implemented by continuous monitoring for such a command, or simply responding to such a command once received. As illustrated in FIG. 3, a loop may be contemplated to continue to use the display panel for displaying other information until the command changing the operational mode or state is received. Then, the method may proceed to S310, where the device may be placed in the on mode and the current program information may be displayed via the display panel. Although not shown for the sake of simplicity, it should be understood that the method of FIG. 3 may be combined with the method of FIG. 2, for example, to implement a method that expands use of the display panel in both "on" and "stand-by" modes of the device.

Again, it should be understood that the processes described above with respect to FIGS. 2 and 3 are only examples, and are not intended to illustrate all possible processes that may be envisioned for implementing the various features described herein. As such, although not shown for the sake of clarity and simplicity, it should be understood that the various features described above may be incorporated in the process, as appropriate or desired, or any other suitable process may be employed. For example, determination of an "off" state of the device may also be a condition for displaying the other information. Because the other information may be disassociated, at least in some respects, from the television programming, such information may be displayed without regard to the television signals and programming received by the device. Thus, it its "off" state, the display panel may be employed while the device is otherwise substantially inactive, as may be defined by the "off" state of the particular device.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of the present invention.

What is claimed is:

1. A method of providing information via a display panel of a television receiving device, the method comprising:
   receiving a television signal including at least one television program at the television receiving device;
   selecting the at least one television program for output by the television receiving device to a television display device;
   displaying information regarding the selected at least one television program on the display panel of the television receiving device;
   configuring a time-keeper to begin monitoring an elapsed time coincident with the instant the television receiving device outputs the selected television program that was received at the television receiving device;
   determining the presence of least one condition that restarts the time-keeper when the time-keeper is monitoring the elapsed time;
   determining the presence of at least one condition that stops and disables the time-keeper when the time-keeper is monitoring the elapsed time;
   displaying information other than the information regarding the selected at least one television program on the display panel of the television receiving device when the elapsed time reaches a predetermined value or when the time-keeper is disabled.

2. The method of claim 1, wherein determining the presence of at least one condition that restarts the time-keeper comprises receiving a user input.

3. The method of claim 1, wherein determining the presence of at least one condition that restarts the time-keeper comprises detecting a change of selected television program.

4. The method of claim 1, wherein determining the presence of at least one condition that stops and disables the time-keeper comprises detecting an indicator that the television receiving device is in a stand-by state.

5. The method of claim 1, wherein determining the presence of at least one condition that stops and disables the time-keeper comprises detecting an indicator that the television receiving device is in an OFF state.

6. The method of claim 1, wherein displaying information other than the information regarding the selected at least one television program comprises displaying on the display panel of the television receiving device information regarding a television program to be aired in the future.

7. The method of claim 6, wherein displaying information regarding a television program to be aired in the future comprises displaying on the display panel of the television receiving device information regarding a next television program to be aired on a same channel as the selected at least one television program.

8. The method of claim 7, wherein the information displayed regarding a next television program includes a time until airing.

9. The method of claim 6, wherein displaying information regarding a television program to be aired in the future comprises displaying on the di splay panel of the television receiving device information regarding a television program that the television receiver device is set to display.

10. The method of claim 6, wherein displaying information regarding a television program to be aired in the future comprises displaying on the display panel of the television receiving device information regarding a television program that the television receiver device is set to record.

11. The method of claim 6, wherein displaying information regarding a television program to be aired in the future comprises displaying on the display panel of the television receiving device information regarding a television program available for purchase.

12. The method of claim 1, wherein displaying information other than the information regarding the selected at least one television program comprises displaying on the display panel of the television receiving device information regarding a message received by the television receiving device.

13. The method of claim 12, wherein the displayed notification is regarding a message received from a television service provider.

14. The method of claim 12, wherein the displayed notification is regarding a message received from another television receiving device.

15. The method of claim 1, wherein displaying information other than the information regarding the selected at least one television program comprises displaying on the display panel of the television receiving device a message received by the television receiving device.

16. The method of claim 15, wherein the displayed message is received from a television service provider.

17. The method of claim 15, wherein the displayed message is received from another television receiving device.

18. A television receiving device for receiving a television signal including a plurality of channels of television programs, the device comprising:
   a tuner configured to select one of the plurality of channels included in the television signal;
   an output configured to provide the television programs of the selected one of the plurality of channels to a television display device;
   a display panel configured to display textual information;
   a time-keeper configured to begin to monitor an elapsed time coincident with an instant the television receiving device outputs a current television program of the television programs of the selected one of the plurality of channels included in the television signal; and
a processor configured to cause the display panel to display information regarding a current television program of the television programs of the selected one of the plurality of channels and to display information other than the information regarding the current television program of the television programs of the selected one of the plurality of channels when the elapsed time reaches a predetermined value or when the time-keeper is disabled.

19. The television receiving device of claim 18, wherein the processor is further configured to detect a user input that restarts the time-keeper and to disable the time-keeper when the television receiving device is in stand-by mode.

20. The television receiving device of claim 18, wherein the time-keeper is a counter in communication with the processor, the counter configured to set the predetermined value.

21. A method of providing information via a display panel of a television receiving device, the method comprising:
receiving a television signal including at least one television program at the television receiving device;
selecting the at least one television program for output by the television receiving device to a television display device;
displaying information regarding the selected at least one television program on the display panel of the television receiving device;
configuring a time-keeper to begin monitoring an elapsed time coincident with the instant the displaying of the information regarding the selected at least one television program on the display panel of the television receiving device begins;
determining the presence of least one condition that restarts the time-keeper when the time-keeper is monitoring the elapsed time;
determining the presence of at least one condition that stops and disables the time-keeper when the time-keeper is monitoring the elapsed time; and
displaying information other than the information regarding the selected at least one television program on the display panel of the television receiving device when the elapsed time reaches a predetermined value or when the time-keeper is disabled.

22. The method of claim 21, wherein determining the presence of at least one condition that restarts the time-keeper comprises receiving a user input.

23. The method of claim 21, wherein determining the presence of at least one condition that restarts the time-keeper comprises detecting a change of selected television program.

24. The method of claim 21, wherein determining the presence of at least one condition that stops and disables the time-keeper comprises detecting an indicator that the television receiving device is in a stand-by state.

25. The method of claim 21, wherein determining the presence of at least one condition that stops and disables the time-keeper comprises detecting an indicator that the television receiving device is in an OFF state.

26. The method of claim 21, wherein displaying information other than the information regarding the selected at least one television program comprises displaying on the display panel of the television receiving device information regarding a television program to be aired in the future.

27. The method of claim 26, wherein displaying information regarding a television program to be aired in the future comprises displaying on the display panel of the television receiving device information regarding a next television program to be aired on a same channel as the selected at least one television program.

28. The method of claim 27, wherein the information displayed regarding a next television program includes a time until airing.

29. The method of claim 26, wherein displaying information regarding a television program to be aired in the future comprises displaying on the display panel of the television receiving device information regarding a television program that the television receiver device is set to display.

30. The method of claim 26, wherein displaying information regarding a television program to be aired in the future comprises displaying on the display panel of the television receiving device information regarding a television program that the television receiver device is set to record.

31. The method of claim 26, wherein displaying information regarding a television program to be aired in the future comprises displaying on the display panel of the television receiving device information regarding a television program available for purchase.

32. The method of claim 21, wherein displaying information other than the information regarding the selected at least one television program comprises displaying on the display panel of the television receiving device information regarding a message received by the television receiving device.

33. The method of claim 32, wherein the displayed notification is regarding a message received from a television service provider.

34. The method of claim 32, wherein the displayed notification is regarding a message received from another television receiving device.

35. The method of claim 21, wherein displaying information other than the information regarding the selected at least one television program comprises displaying on the display panel of the television receiving device a message received by the television receiving device.

36. The method of claim 35, wherein the displayed message is received from a television service provider.

37. The method of claim 35, wherein the displayed message is received from another television receiving device.

38. A television receiving device for receiving a television signal including a plurality of channels of television programs, the device comprising:
a tuner configured to select one of the plurality of channels included in the television signal;
an output configured to provide the television programs of the selected one of the plurality of channels to a television display device;
a display panel configured to display textual information;
a time-keeper configured to begin to monitor an elapsed time coincident with an instant the displaying of the information regarding the selected at least one television program on the display panel of the television receiving device begins; and
a processor configured to cause the display panel to display information regarding a current television program of the television programs of the selected one of the plurality of channels and to display information other than the information regarding the current television program of the television programs of the selected one of the plurality of channels when the elapsed time reaches a predetermined value or when the time-keeper is disabled.

39. The television receiving device of claim 38, wherein the processor is further configured to detect a user input that restarts the time-keeper and to disable the time-keeper when the television receiving device is in stand-by mode.

40. The television receiving device of claim 38, wherein the time-keeper is a counter in communication with the processor, the counter configured to set the predetermined value.

* * * * *